United States Patent [19]

Shimano et al.

[11] 3,848,784

[45] Nov. 19, 1974

[54] BICYCLES-LADING APPARATUS

[76] Inventors: Keizo Shimano; Tokiharu Nishino, both c/o Shimano Industrial Co., Ltd., No. 77, 3-cho, Oimatsu-cho, both of Osaka, Japan

[22] Filed: Jan. 3, 1972

[21] Appl. No.: 214,604

[30] Foreign Application Priority Data
June 26, 1971 Japan.............................. 46-46635

[52] U.S. Cl................. 224/42.1 F, 211/22, 217/37, 280/278, 280/289
[51] Int. Cl............................................... B60r 9/10
[58] Field of Search...... 224/42.1 F, 42.1 E, 42.1 H, 224/42.1 G, 42.1 D, 42.1 R, 42.03 B; 280/292, 293, 402; 211/17, 22; 248/119 R; 206/46 M; 217/37, 38; 280/287, 289, 7.14, 14; 115/2, 21, 23; 272/73; D90/18

[56] References Cited
UNITED STATES PATENTS

| | | |
|---|---|---|
| 588,376 | 8/1897 | Banker................................ 211/17 |
| 2,339,947 | 1/1944 | Reaume........................... 217/37 X |
| 3,581,962 | 6/1971 | Osborn........................... 224/42.1 E |
| 3,615,105 | 10/1971 | Harris................................. 280/292 |
| 3,677,451 | 7/1972 | Burland........................... 224/42.1 F |

FOREIGN PATENTS OR APPLICATIONS

| | | |
|---|---|---|
| 1,425,202 | 1966 | France........................... 224/42.1 F |

*Primary Examiner*—Robert J. Spar
*Assistant Examiner*—Jerold M. Forsberg

[57] ABSTRACT

An apparatus for carrying several bicycles unmovably laden on the roof of a passenger car comprising frame members respectively provided on said roof by use of mounting means, said frame members having a means for interlocking therewith the pawl member of a front fork so as to rigidly mount a bicycle, and a wheel mounting stand for mounting the rear wheel of said bicycle. After the front wheel is dismounted from said front fork, said fork is fixed to said interlocking means of the frame member, thereafter the rear wheel being unmovably laden on said stand.

7 Claims, 8 Drawing Figures

BICYCLES-LADING APPARATUS

The present invention relates to a bicycles-lading apparatus to be used on a passenger car, and more particularly it relates to improvements in such a type of bicycles-lading apparatus adapted to be mounted on the roof of a passenger car thereby permitting bicycles to be laden unmovably for transportation.

In order to load a passenger car with a bicycle, it has previously been necessary to disassemble the bicycle into many parts so as to take them in a trunk or luggage boot of the car. However, for this purpose, a bicycle must be so constructed as can be easily disassembled and then assembled. Thus the conventional bicycles being difficult of such disassembling and assembling operations without the help of a person skilled in the field, and further due to the limited space of the trunk, at most the disassemblage of only one bicycle can be taken in the trunk.

In recent years the interest of the public has become so great in cycling that many people are often seen cycling in family circles or in a group of like-minded persons. However, due to the increasingly heavy congestion of urban traffic, they will be in danger of involvement in traffic accidents if they cycle in such streets. Accordingly, they prefer to going out by passenger car laden with a bicycle to nearby suburban districts or rural places so that they can enjoy cycling free from traffic dangers. For this purpose, however, it is necessary for them to provide an apparatus for lading several bicycles on a passenger car so as to carry all of them at a time to any desired places where they can enjoy cycling.

The present invention has been designed to meet with the above-mentioned requirements and has for one of its main objects the provision of a bicycles-lading apparatus which is adapted to be mounted on the roof of a passenger car so as to transport several bicycles at a time. Another object of the invention is to provide such a bicycles-lading apparatus as can lade several bicycles on the car without the necessity of disassembling them into so many parts that they cannot be easily dismounted from the apparatus when the car has arrived at its destination.

In other words, the present invention has been devised to make the most of the common construction of all types of bicycles in which the front wheel is adapted to be easily disassembled from the front fork. Namely, said front wheel comprises a hub means which is rotatably mounted about the center shaft thereof and a main wheel body which is mounted on said hub means through a plurality of spoked in a manner that said center shaft is held in the foremost pawl member of the front wheel so as to be rigidly fixed at both ends by means of a nut or any other suitable tightening means. Or to be more precise, said hub means of the front wheel is not constructed with such free wheels or the like that are generally provided on a rear wheel so that the front wheel can be easily dismounted from the front fork merely by loosening the screwably tightened condition of said nut or the like.

Thus the present invention aims at dismounting the front wheel from the foremost pawl member of the front fork and then rigidly fixing the fork to a fitting means of the frame member forming a bicycles-lading apparatus. In this case, the advantages with the above-mentioned fixing operation carried out by use of the pawl member are that the front fork can be fixed to the fitting means as easily and exactly as in the case that it is initially fixed to the center shaft of the front wheel, and therefore that it can also be easily dismounted from the fitting means when the car has arrived at its destination.

The accompanying drawings illustrate some preferred embodiments of the present invention.

Figure 1:
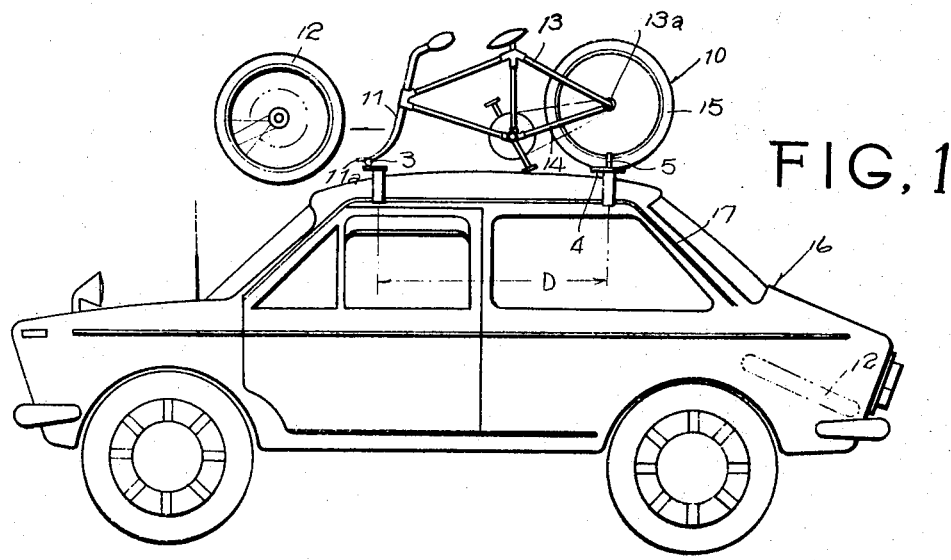
FIG. 1 is a side elevation view showing how a passenger car is laden with several bicycles for transportation.
Figure 2:
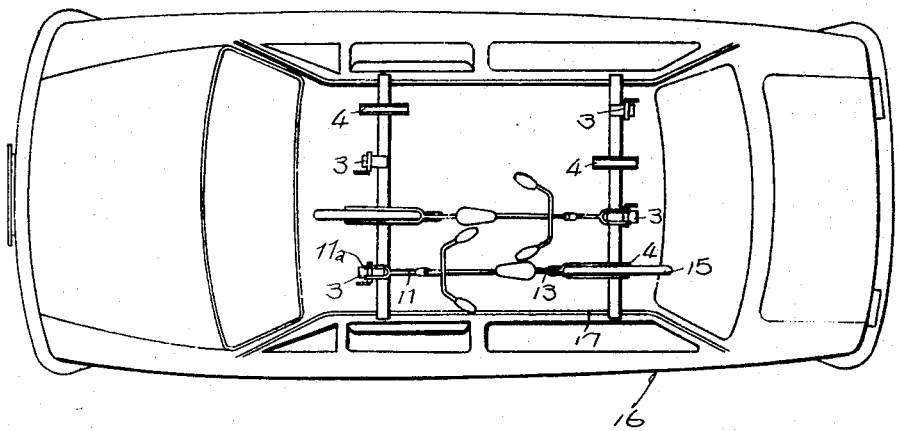
FIG. 2 is a plan view showing a bicycles-lading apparatus of the invention.

Now setting forth in detail some preferred embodiments of the present invention with reference to the accompanying drawings, reference numeral 10 in FIGS. 1 and 2 generally designates one or more bicycles to be carried on a passenger car to any desired place, which bicycles may be of any type and size for either adults or children.

Said bicycle 10 has a front wheel 12 mounted to a front fork 11 and a rear wheel 15 mounted to a back fork 13 which is common to the conventional type bicycle. These front and rear wheels 12 and 15 have hub means, respectively, and center shafts rotatably mounted therein. The center shafts are held in the pawl member 11a of the front fork and the pawl member 13a of the back fork 13, respectively, so as to be fixed between these pawl members 11a and 13a by tightening up screwed nuts, respectively.

As has already been mentioned, the front wheel 12 is not provided with a driving chain 18 nor provided with such parts that are provided on the rear wheel 15 so that the front wheel 12 can be easily dismounted from the pawl member 11a merely by loosening said screwed nut.

Numeral 16 generally denotes a private passenger car to be used for carrying the aforesaid bicycles 10, said car being normally provided in the edge of the roof thereof with an eaves trough-like projection 17.

Figure 3:
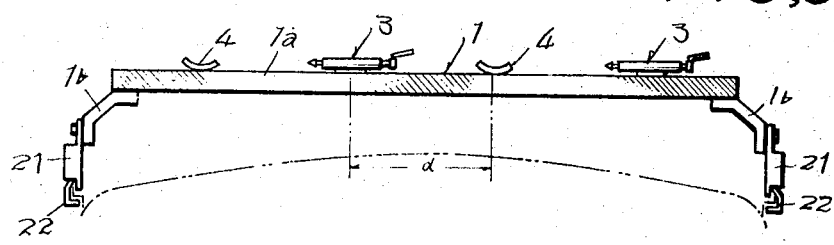
FIG. 3 is a front elevation view showing the elemental parts thereof.

The present invention aims at carrying several bicycles 10 by use of the above-mentioned general type passenger car 16. Reference numeral 1 designates a main frame body which is adapted to mount the bicycles 10, comprising horizontal frame members having a length substantially equal to the width of the roof of the car 16, and leg members 1b respectively extending downwardly of said frame member in continued relation therewith. Said main frame body 1 may be constructed integrally with the horizontal frame members 1a and the leg members 1b by using a single piece of traversely round shape metallic pipe material or otherwise it may also be formed with a piece of traversely square shape metallic pipe material which substitutes for said horizontal frame member 1a, and another piece of any traversely available shaped metallic pipe material which substitutes for said leg members 1b as is clearly shown in FIGS. 3 and 4, respectively. If said traversely square shape metallic pipe material disclosed in the present embodiment is formed at its both ends with each of slots 1a' as shown in FIG. 5 that can move the leg member 1b composed of a different material and connected to said former material, then said main frame body 1 can be easily mounted on the roof of the passenger car 16 even if there is a slight difference in the width of the roof. Each lower portion of the leg members 1b thus formed is provided with a fixing member 2 for detachably fixing the main frame body 1 to said projection 17.

Figure 4:
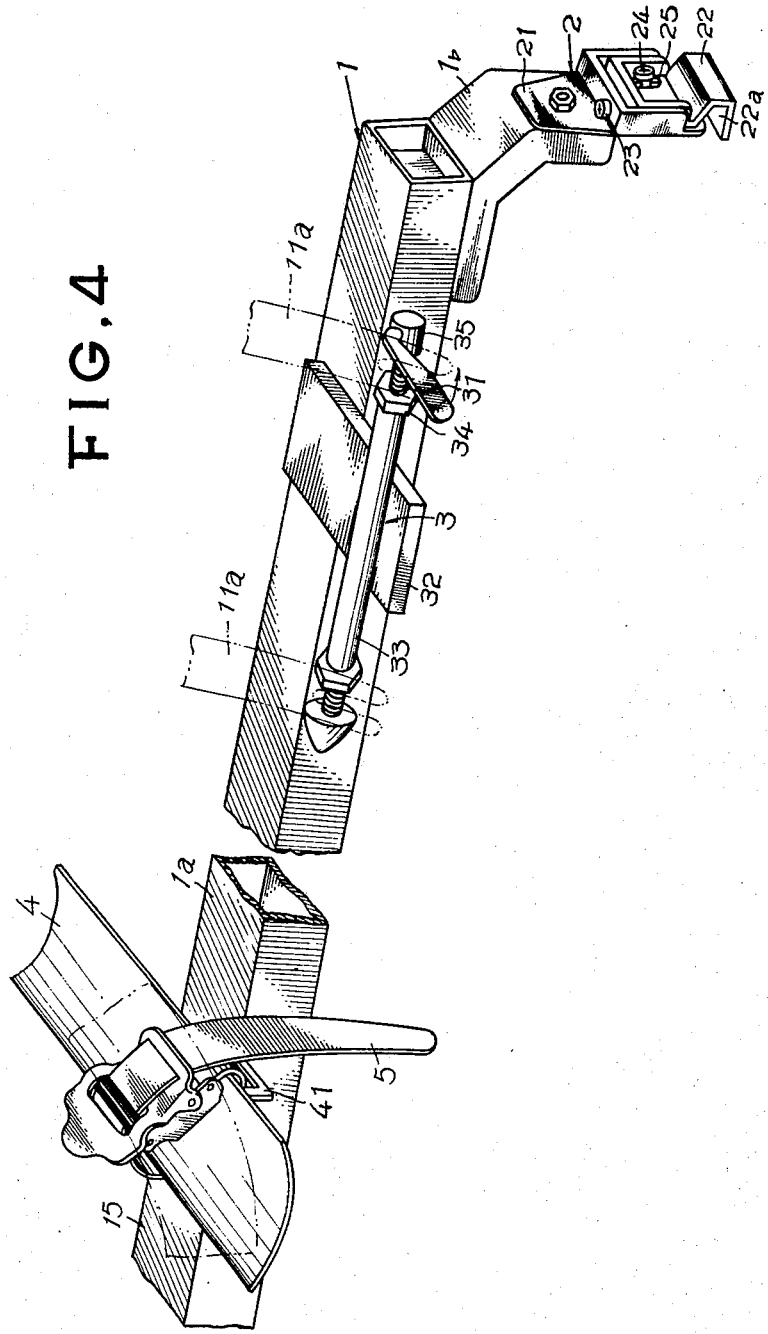
FIG. 4 is a perspective view extensively showing the same embodiment.
Figure 5:
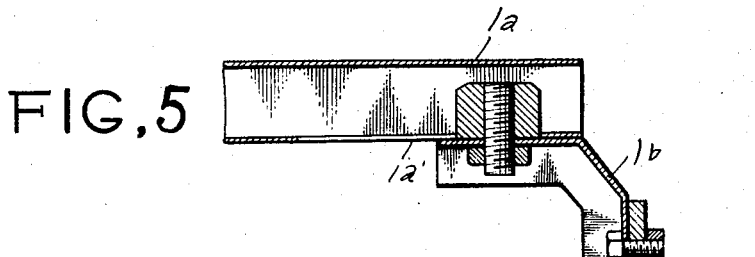
FIG. 5 is a vertical sectioned view of the mounting means of FIG. 4.

As is definitely clear in FIGS. 4 and 5, said fixing member 2 is movably mounted to a fixing piece 21 fixed rigidly to each of said leg members 1b and comprises a moving piece 22 having a tightening face 22a opposed to the lower end of said fixing piece 21.

Incidentally, numeral 23 designates a bolt means mounted between the fixing members 2 in the same direction that the moving piece 22 is adapted to move. Thus if the bolt means 23 is turned, the moving piece 22 can be moved either up or down so that said tightening face 22a is moved closer to or away from the lowest end of the fixing piece 21. Likewise, numeral 24 is a bolt means mounted between the fixing piece 21 and the moving piece 22 at right angles with the direction where the latter piece 22 can be moved. Thus if the bolt means 24 is turned, both sides of the moving piece 22 are brought into contact with the side of the fixing piece 21 so as to hold the moving piece 22 in position.

Accordingly, in order to fixedly mount the bicycles-lading apparatus of the present invention to the eaves trough-like projection 17 of the passenger car 16 by use of said fixing members 2, said projection 17 is inserted between the lowest end of the fixing piece 21 and the tightening face 22a of the moving piece 22 and thereafter the bolt means 23 is turned to move said moving piece 22 upwardly thereby bringing the tightening face 22a close to the lowest end of the fixing piece 21, the result being that the projection 17 is held between the moving piece 22 and the tightening face 22a.

In this case, the bolt means 24 is turned to bring the moving piece 22 into tightened contact with the fixing piece 21.

Incidentally, numeral 25 is a slot formed in one side of the moving piece 22. The frame mebers 1 fixedly mounted on the roof of the car 16 are respectively mounted in a pair on the upper surface of said roof at desired intervals equal to the length D shown in FIG. 1 as spanning between the front and rear wheels of a bicycle loaded on the car 16.

Figure 8:
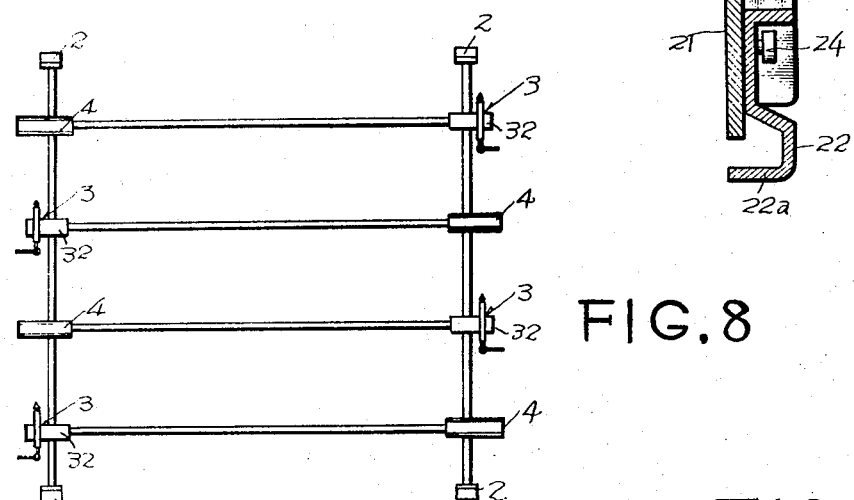
FIG. 8 is a plan view explaining the mounting and fixing means.

In the present embodiment, each pair of frame members 1a are independently formed. However, they may also be previously connected with each other by use of connecting means as shown in FIG. 8. The frame members 1 formed in the above-mentioned manner have their respective horizontal portion 1a alternately provided in regularly spaced apart intervals d with a fixing means 3 which is interlocked with the pawl member 11a of the front fork 11 of the bicycle 10, and with a wheel lading stand 4 which is adapted to mount thereon a rear wheel 15 and so curved as to correspond with the outer peripheral configuration of the rear wheel 15.

Said fixing means 3 has a shaft 31 which is substantially same in diameter as the shaft to be engaged with the pawl member 11a of the front fork 11, i.e., the center shaft to be inserted in the hub of the front wheel 12. Said shaft 31 is threaded at both ends and inserted in a cylindrical shaft 33 which is shorter in length than the shaft 31. Said cylindrical shaft 33 is rigidly fixed to a metallic plate 32 inseparably mounted to the frame member 1 for example by welding means.

Further, said shaft 31 is integrally connected with the cylindrical shaft 33 by screwing a locknut 34 to this shaft. One of the threaded ends of said shaft 31 which are projected outwardly of the shaft 33 is provided with a tightening means 35 which serves to tighten up said pawl member 11a of the front fork 11 toward the locknut 34 when the member 11a is interlocked with the shaft 31.

Figure 6:
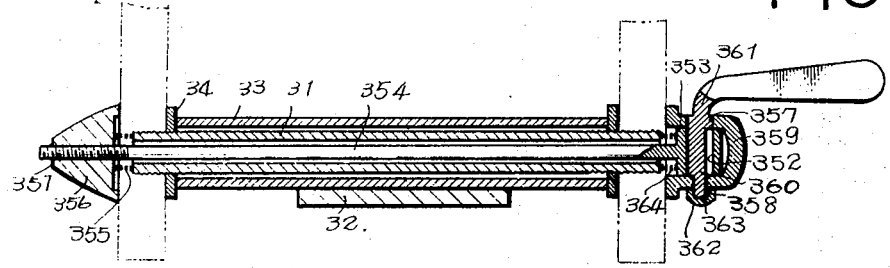
FIG. 6 is likewise a vertical sectioned view of the fixing means of FIG. 4.
Figure 7:
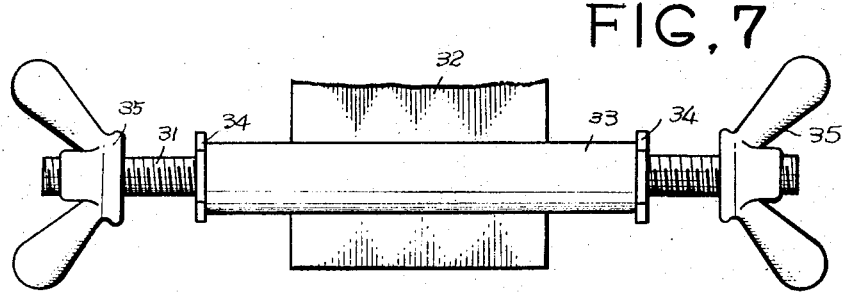
FIG. 7 is a partially exploded plan view explaining another embodiment of the invention.

While a simple form of said tightening means 35 is such a thumb nut as is illustrated in FIG. 7, it may also be formed as shown in FIGS. 4 and 6; according to which, said shaft 31 is hollow to insert therethrough a rod 354 having its one end formed with threads 351 and its other end formed with a projection 353 including a hole 352 whereby a mounting nut 356 is screwed up to said threads 351 by means of a helical spring 355 and said projection 353 is crowned with a cap nut 359 having two holes 357 and 358 respectively of a different diameter which are formed in diametrally opposed direction so as to correspond said hole 352 to the holes 357 and 358, thus making it possible to insert a cam means 360 in said hole 352.

Incidentally, 361 is a cam operating lever extended from one end of said cam means 360 while 362 is a nut which is screwably engageable with the center shaft 363 provided with the other end of said cam means 360 and serves to mount the same means 360 in the inside of the hole 352. 364 is a helical spring held between the shaft 31 and the projection 353.

In order to tighten up the pawl member 11a of the front fork 11 interlocked with the shaft 31 just as shown in FIGS. 4 and 6, the mounting nut 356 is previously screwed to a desired position of the rod 354 in a manner that the space between the locknut 34 and the mounting nut 356 and the space between the locknut 34 and the projection 353 are respectively slightly longer than the width of the pawl member 11a so that if the lever 361 is turned after the pawl member 11a has engaged with the shaft 31, then the cam means 360 is also turned to move the cap nut 359 to the pawl member 11a with respect to the projection 353, the result being that the pawl member 11a is securedly held between the cap nut and the projection. On the contrary, the dismounting of the pawl member 11a is easily carried out by turning the lever 361 opposedly to the above-mentioned direction.

In the meanwhile, the rear wheel 15 of the bicycle 10 is mounted on the wheel lading stand 4 and the front fork 11 from which the front wheel 12 has been removed is rigidly fixed to the fixing means 3. In this case, said wheel lading stand 4 is formed in a predetermined length so that any type of bicycles having a different length that spans between the front and rear wheels can be mounted at a time on the main frame body 1 which is constructed in regularly spaced apart intervals on the roof of the car 16.

The rear wheel 15 mounted on the wheel lading stand 4 is then rigidly secured thereto by means of a tightening belt means 5. By the way, numeral 41 is a metallic device for supporting said tightening belt means 5. In the present embodiment, the rigid mounting of the rear wheel 15 may be mechanically carried out without using the belt means 5, or otherwise the wheel lading stand 4 may be movably formed in place of being fixedly mounted to the main frame body 1.

As is clearly evident from the above description, in order to carry several bicycles 10 laden on the car 16, the front wheel 12 is firstly dismounted from the front fork 11 and then the pawl member 11a thereof which supports said front wheel 12 is tightly engaged with the shaft 31 of one frame member 1 which is connected to another frame member 1 so as to form a pair, and thereafter the rear wheel 15 is mounted to the wheel lading stand 4 mounted on said another frame member 1 thereby tightening said rear wheel 15 by means of the tightening belt means 5.

Furthermore, on said frame members 1 in a pair are alternately provided the fixing means 3 and the wheel lading stand 4 in a manner that when said members 1 are mounted on the roof of the car 16, the fixing means 3 and the wheel lading stand 4 are disposed in opposed relation with each other, thus the result being that another bicycle 10 can be also mounted close to the previously mounted bicycle 10 in the direction opposed thereto without producing a big space between a pair of frame members 1.

Thus it is understood that, according to the present invention, it is possible to fully use the roof of the car 16 to lade thereon at least four or five bicycles at a time. In this case, the front wheel dismounted from the bicycle 10 is accommodated for example in the trunk of the car 16. Accordingly, by employing the bicycles-lading apparatus of the invention, every passenger car owner is able to carry several bicycles at a time without an interference to his safe driving operation since the bicycles are laden in such a manner as not to form a bulky size.

It is to be understood that various changes and modifications in designs also belong to the scope of the present invention.

What is claimed is:

1. An apparatus mounted on the roof of a passenger car and adapted to carry bicycles whose front wheels are dismounted from the pawl members of the front forks comprising,
   a. mounting means rigidly fixed on said roof of the passenger car,
   b. frame members fixed to said roof through means of said mounting means,
   c. fixing means which are fixed to the upper surface of said frame members and adapted to fix the front forks of the bicycles thereto comprising plates secured to said frame members, cylindrical shafts secured to said plates and disposed substantially in parallel to said frame member, hollow shafts insertibly fixed to each of said cylindrical shafts, lock nuts releasably securing said hollow shaft to said cylindrical shaft, a solid rod inserted in each said hollow shaft and each having one end thereof provided with threads and the other end provided with a projection bored with a transverse hole, a nut means screwably engageable with said threads of the rod, a cam means inserted in said transverse hole, and a cap nut for rotatably supporting said cam means, whereby each fork tine is clamped between said lock nut and said nut means at one end and said lock nut and said cap means at the other end of said solid rods,
   d. wheel lading stands which are fixed to said upper surface of the frame member and adapted to mount thereon the rear wheels of said bicycles and,
   e. retaining means for fixedly securing said rear wheels to said wheel lading stands.

2. An apparatus mounted on the roof of a passenger car and adapted to carry bicycles as set forth in claim 1 comprising said front fork and said wheel lading stand alternately provided on the frame members which are respectively secured between the front and rear portions of said passenger car.

3. An apparatus mounted on the roof of a passenger car and adapted to carry bicycles as set forth in claim 1, in which said frame member comprises a horizontal portion having substnatially the same length as the width of said passenger car and leg members adapted to be mounted to both ends of said horizontal portion in movable relation therewith.

4. An apparatus mounted on the roof of a passenger car and adapted to carry bicycles as set forth in claim 1, in which said horizontal portion of the frame member is provided with a slot and said leg member is provided with a screw means having a head of a larger diameter than the width of said slot so as to tighten up said screw means by tightly screwing a locknut in said slot so as to permit said leg means to move with respect to said horizontal portion by loosening said locknut.

5. An apparatus for carrying bicycles as set forth in claim 1 in which said cam means is provided with a cam operating lever.

6. An apparatus for carrying bicycles as set forth in claim 1 in which said wheel lading stand is provided with a supporting metallic means thereby to support a tightening belt means for tightening up the rear wheel of the bicycle mounted on said stand.

7. An apparatus mounted on the roof of a passenger car and adapted to carry bicycles whose front wheels are dismounted from the pawl members of the front forks comprising,
   a. mounting means rigidly fixed to said roof of the passenger car,
   b. frame members fixed to said roof through means of said mounting means,
   c. fixing means which are fixed to the upper surface of said frame member and adapted to fix the front fork of the bicycle thereto, comprising plates secured to said frame members, cylindrical hollow shafts secured to said plates, solid shafts which are substantially parallel to each of said frame members and inserted in each of said cylindrical shafts, lock nuts releasably securing said solid shafts to said cylindrical shafts, and wing nut means being screwably engageable with each side of said solid shaft whereby each front fork interlocked with said solid shaft is tightened up to said lock nuts
   d. wheel lading stands fixed to said upper surface of the frame members and adapted to mount the rear wheel, and
   e. retaining means for fixedly securing said rear wheel to said wheel lading stands.

* * * * *